Dec. 17, 1963   P. P. TUSZYNSKI   3,114,581
BRAKE SYSTEM
Filed Feb. 13, 1961

INVENTOR.
PAUL P. TUSZYNSKI
BY
William N. Antonis
ATTORNEY

United States Patent Office 3,114,581
Patented Dec. 17, 1963

3,114,581
BRAKE SYSTEM
Paul P. Tuszynski, South Bend, Ind., assignor to The Bendix Corporation, South Bend, Ind., a corporation of Delaware
Filed Feb. 13, 1961, Ser. No. 88,766
7 Claims. (Cl. 303—2)

This invention relates to brake systems and more particularly to improvements in a brake system of the type disclosed in S. I. MacDuff's application Serial No. 88,130, wherein a hydraulic auxiliary brake system is utilized in conjunction with a hydraulic service brake system.

An object of this invention is to provide an auxiliary brake system which utilizes a fluid pressure source other than the one utilized by the conventional service brake system and which utilizes conduits extending to each brake unit other than those which are utilized in connection with the conventional service brake system.

A primary object of this invention is to provide means whereby normal use of the conventional service brake system will automatically charge an accumulator used as a pressure source for the auxiliary brake system.

More specifically, it is an object of this invention to incorporate an intensifier in the hydraulic service brake line which will automatically charge an accumulator, of the hydro-pneumatic energy storage type, upon each service brake application, thereby eliminating the manual operations previously required of the drive to charge the accumulator. A relief valve may be provided in the system for preventing overpressurization of the accumulator.

The above and other objects and features of the invention will become apparent from the following description taken in connection with the accompanying drawing which forms a part of this specification and in which.

Figure 1:
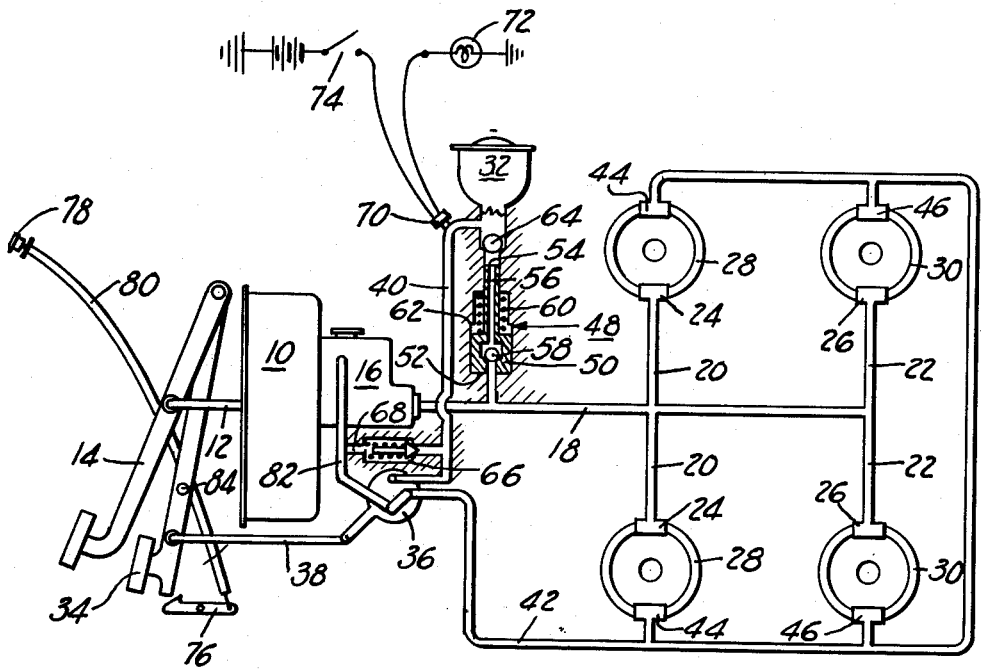
FIGURE 1 is a diagrammatic view of a brake system incorporating the invention.

Shown diagrammatically in FIGURE 1 is a service brake system which includes a vacuum or other suitable booster 10 connected by an actuating rod 12 to a brake pedal 14. When the foot pedal 14 is depressed, a master cylinder 16 forces fluid under pressure through hydraulic fluid conduits 18, 20, and 22 to fluid pressure responsive brake motors 24 and 26. The brake motors 24 and 26 are associated with the front and rear axle brakes 28 and 30, respectively.

Such a service brake system has certain inherent difficulties, one of which is that failure of any of the motors 24 or 26, or the master cylinder 16, or any of the lines therebetween will result in complete failure of the braking system due to loss of fluid with which to effect braking. Various approaches have been utilized to obviate these difficulties, the most reliable of which, perhaps, involves the use of a separate cylinder and piston for the front and rear wheels, respectively, so that upon failure in the brake motors or lines associated with one set of wheels, braking will still exist in the other set of wheels. Such a system at best, in the event of failure, would provide only partial braking.

Accordingly, it is proposed to utilize an auxiliary brake system which will provide full braking when required and will function as a dual purpose emergency and parking brake system. The auxiliary system includes a hydro-pneumatic energy storage device 32 which may be of the type described in S. I. MacDuff's U.S. Patent No. 2,893,433, a brake pedal 34, and a brake valve 36 suitably connected to the brake pedal by an actuating rod 38. A hydraulic fluid conduit 40 communicates accumulator 32 with the brake valve 36 and a hydraulic fluid conduit 42 communicates the brake valve with the fluid pressure responsive brake motors 44 and 46. The brake valve 36 is a three-way valve, which may be of the face type, having a first position as shown in FIGURE 1 for preventing flow of hydraulic fluid from the accumulator 32 to the brake motors 44 and 46 and a second position which is obtained upon depression of brake pedal 34. In the second position conduit 40 is communicated with conduit 42 so that pressurized fluid may flow from the accumulator to the brake motors.

In order to maintain the pressure in the accumulator at a predetermined value, an intensifier 48 is utilized to automatically divert to the accumulator a portion of the hydraulic fluid flowing from the master cylinder upon each application of service brake pedal 14. The intensifier includes a pressure responsive piston 50 which has a large area 52 subject to the hydraulic pressure in conduit 18 and a small area 54. A bore 56 extends through the piston from the large area end to the small area end and a check valve 58 is located in the bore for trapping hydraulic fluid between the check valve and the accumulator 32. A spring 60 opposes movement of piston 50. Thus, upon depression of service brake pedal 14, the master cylinder 16 pressurizes the service brake conduits and wheel cylinders. This pressure acts on the large area 52 of the intensifier piston 50, thereby causing compression of the return spring 60 until the piston abuts shoulder 62. This movement causes a portion of the hydraulic fluid trapped on the previous service brake application between the check valve 52 in the intensifier and the check valve 64 in the accumulator to be forced into the accumulator. Upon release of the service brake pedal the return spring 60 will return the intensifier piston to its normal position during which return the intensifer check valve 58 will be unseated by the hydraulic pressure acting thereagainst and the fluid previously charged into the accumulator will be replenished. If the accumulator pressure reaches a predetermined value, that is, if it becomes fully charged, the relief valve 66 will permit the intensified hydraulic fluid entering the accumulator during each brake pedal stroke to return to the master cylinder reservoir via conduit 68. In order to provide means for indicating when the pressure in the accumulator has fallen below a predetermined value, a switch 70 is provided, which closes a circuit at the predetermined low limit of pressure and warns the vehicle operator through a signal light 72 that pressure fluid should be added to the accumulator. It will be noted that the circuit will not be closed unless the operator has first turned on the ignition switch 74.

When the car is parked, the auxiliary system may be used as a parking brake by depressing auxiliary brake pedal 34. This causes the brake valve 36 to move to a position which will permit passage of hydraulic fluid from the accumulator 32 to the brake motors 44 and 46. A latch 76, which is releasable through knob 78 and Bowden wire 80, retains pedal 34 in its depressed position so that the accumulator pressure will cause a continuous braking action. Expansion and contraction of the fluid in the brake mechanism and any leakage is continuously compensated for by flow in or out of the accumulator with negligible effect on the pressure. Release of the latch 76 will permit spring return of the brake valve 36 to the illustrated position thereby permitting pressure fluid to flow from the auxiliary brake wheel cylinders back to the reservoir of master cylinder 16 through conduits 42 and 82.

Figure 2:
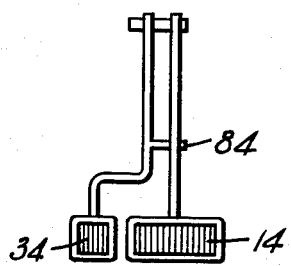
FIGURE 2 is another view of the service and emergency brake foot pedal arrangement.

Normally, the service brake pedal 14 is movable in a first range when the service brake system is in order and will not cause actuation of the auxiliary brake system. However, upon failure of the service brake system, the brake pedal 14 will move into a second range wherein it will engage a projection 84 extending from auxiliary brake pedal 34 as shown in FIGURE 2. Upon contact with the projection 84 any further movement of service brake pedal 14 will cause concomitant movement of the auxiliary brake pedal 34 and will result in actuation of the auxiliary brake system. Means not shown should be provided for rendering the latch 76 inoperative under this condition so that the driver can release the brakes by raising pedal 14.

Figure 3:
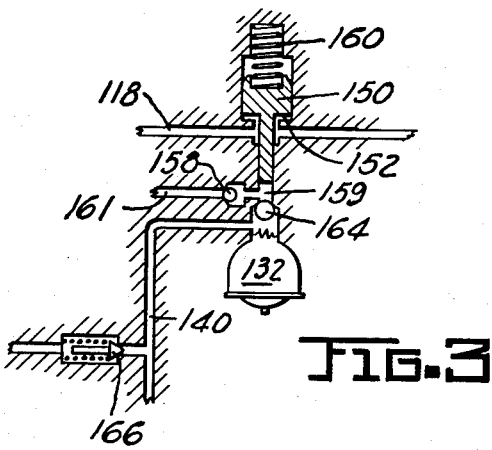
FIGURE 3 is an alternate embodiment of the invention for use in the brake system shown in FIGURE 1.

An alternate system for automatically charging accumulator 32 upon each brake application is shown in FIGURE 3. In this figure, like parts are designated by like numbers plus 100. In this embodiment each service brake application will send pressurized hydraulic fluid from the master cylinder to act on the large area 152 of piston 150, thus compressing the return spring 160 while simultaneously admitting fluid through a check valve 158 to chamber 159 via passage 161 which communicates with the master cylinder reservoir. As the service brakes are released, the compressed spring 160 will return the piston to its original position, thereby forcing the fluid which is trapped in the chamber 159 to flow into the accumulator 132. In this manner charging of the accumulator through check valve 164 is accomplished. Obviously, such charging will occur during each brake application. However, if the pressure in the accumulator exceeds a predetermined value, relief valve 166 will permit flow of fluid from the accumulator to the master cylinder reservoir to prevent overcharging of the accumulator. In this embodiment relief valve 158 may be eliminated, if the maximum load of return spring 160 is made to balance off the maximum desired fluid pressure in the accumulator. Thus, when the pressure in the accumulator reaches a value at which the force exerted is greater than the force exerted by the spring, no further charging of the accumulator will occur.

The several practical advantages which flow from this brake system are believed to be obvious from the above and other advantages may suggest themselves to those who are familiar with the art to which this invention relates.

Having thus described the various features of the invention, what I claim as new and desire to secure by Letters Patent is:

1. In combination with a service brake system having brake applying motor means, conduit means, hydraulic means for displacing hydraulic fluid to said brake applying motor means via said conduit means, and means for actuating said hydraulic means, a dual purpose emergency and parking brake system comprising auxiliary conduit means, a hydro-pneumatic energy storage device for displacing hydraulic fluid to said brake applying motor means via said auxiliary conduit means, auxiliary means for actuating said hydro-pneumatic energy storage device, passage means for communicating said hydraulic means with said hydro-pneumatic energy storage device, hydraulic intensifier means located in said passage means for diverting a portion of the fluid from said hydraulic means to said hydro-pneumatic energy storage device upon each operation of said first mentioned actuating means to thereby increase the pressure in said device to a predetermined value, and means located in said passage means for relieving pressure in said device when said pressure rises above said predetermined value.

2. In combination with a service brake system having brake applying motor means, conduit means, hydraulic means for displacing hydraulic fluid to said brake applying motor means via said conduit means, and means for actuating said hydraulic means, a dual purpose emergency and parking brake system comprising auxiliary conduit means, a hydro-pneumatic energy storage device for displacing hydraulic fluid to said brake applying motor means via said auxiliary conduit means, auxiliary means for actuating said hydro-pneumatic energy storage device, said auxiliary actuating means including valve means located in said auxiliary conduit means and having a first position for preventing flow of hydraulic fluid from said energy storage device to said brake applying motor means and a second position for permitting flow of fluid therebetween, passage means for communicating said hydraulic means with said hydro-pneumatic energy storage device, and hydraulic intensifier means located in said passage means for diverting a portion of the fluid from said hydraulic means to said hydro-pneumatic energy storage device upon each operation of said first mentioned actuating means to thereby increase the pressure in said device to a predetermined value.

3. A brake system as defined in claim 2 wherein said passage means includes means for relieving pressure in said storage device when said pressure rises above said predetermined value.

4. A brake system as defined in claim 3 wherein said hydraulic intensifier means includes a pressure responsive piston having a large area subject to the hydraulic pressure in said service brake system conduit means and a small area, resilient means for opposing movement of said piston, passage means for communicating the large area of said piston with the small area of said piston and check valve means located in said passage means for trapping hydraulic fluid between said check valve means and said hydro-pneumatic energy storage device for subsequent charging of said energy storage device upon movement of said piston due to operation of said service brake system actuating means.

5. A brake system as defined in claim 4 wherein said passage means comprises a bore extending through said piston from said large area to said small area.

6. A brake system as defined in claim 2 wherein said hydraulic intensifier means includes a pressure responsive piston having a large area subject to the hydraulic pressure in said service brake system conduit means and a small area communicating with said hydraulic means via said passage means, resilient means for opposing movement of said piston, and check valve means located in said passage means for trapping hydraulic fluid between said piston and said hydro-pneumatic energy storage device for subsequent charging of said energy storage device upon movement of said piston due to operation of said service brake system actuating means.

7. In combination with a service brake system having brake applying motor means, conduit means, hydraulic means for displacing hydraulic fluid to said brake applying motor means via said conduit means, and means for actuating said hydraulic means, a dual purpose emergency and parking brake system comprising auxiliary conduit means, a hydro-pneumatic energy storage device for displacing hydraulic fluid to said brake applying motor means via said auxiliary conduit means, auxiliary means for actuating said hydro-pneumatic energy storage device, a pressure responsive piston having a large area subject to the hydraulic pressure in said first mentioned conduit means and a small area, a chamber formed between the small area of said piston and said hydro-pneumatic energy storage device, passage means communicating said hydraulic means with said chamber, and check valve means located in said passage means for trapping hydraulic fluid in said chamber for subsequent charging of said energy storage device upon movement of said piston due to operation of said first mentioned actuating means.

References Cited in the file of this patent

UNITED STATES PATENTS

| | | |
|---|---|---|
| 1,885,580 | Bradbury | Nov. 1, 1932 |
| 2,322,062 | Schnell | June 15, 1943 |
| 2,343,809 | Schnell | Mar. 7, 1944 |
| 2,402,115 | Levy | June 11, 1946 |
| 2,595,248 | Greer et al. | May 6, 1952 |